United States Patent
Song et al.

(10) Patent No.: US 10,488,684 B2
(45) Date of Patent: Nov. 26, 2019

(54) DISPLAY APPARATUS HAVING A REDUCED-WIDTH BEZEL AND METHOD OF MANUFACTURING THE SAME

(71) Applicant: SAMSUNG DISPLAY CO., LTD., Yongin-si, Gyeonggi-do (KR)

(72) Inventors: A-Ram Song, Hwaseong-si (KR); Joon-Chul Goh, Hwaseong-si (KR); Soo-Yeon Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/947,515

(22) Filed: Nov. 20, 2015

(65) Prior Publication Data

US 2016/0266426 A1 Sep. 15, 2016

(30) Foreign Application Priority Data

Mar. 11, 2015 (KR) ........................ 10-2015-0034080

(51) Int. Cl.
 *G02F 1/133* (2006.01)
 *G02F 1/1333* (2006.01)
 *G02F 1/1362* (2006.01)
 *G02F 1/1345* (2006.01)

(52) U.S. Cl.
 CPC ...... *G02F 1/13306* (2013.01); *G02F 1/13452* (2013.01); *G02F 1/133305* (2013.01); *G02F 1/136286* (2013.01); *G02F 1/1345* (2013.01); *G02F 1/13454* (2013.01); *G02F 2001/133368* (2013.01); *G02F 2001/136295* (2013.01)

(58) Field of Classification Search
None
See application file for complete search history.

(56) References Cited

U.S. PATENT DOCUMENTS

| | | | | |
|---|---|---|---|---|
| 4,986,637 A | * | 1/1991 | Yamaguchi | G02F 1/133514 345/32 |
| 7,479,642 B2 | * | 1/2009 | Maack | G02F 1/134336 250/394 |
| 9,607,581 B2 | * | 3/2017 | Park | G09G 5/18 |
| 9,769,919 B2 | * | 9/2017 | Park | H05K 1/147 |

(Continued)

FOREIGN PATENT DOCUMENTS

| | | |
|---|---|---|
| CN | 103926774 A | 7/2014 |
| EP | 0302653 | 2/1989 |

(Continued)

OTHER PUBLICATIONS

European Office Action issued in corresponding European Application No. 16159958.4 dated Sep. 19, 2017.

*Primary Examiner* — Ryan Crockett
(74) *Attorney, Agent, or Firm* — F. Chau & Associates, LLC (57) ABSTRACT

A display apparatus includes a display panel and a display panel driver. The display panel includes a lower substrate and an upper substrate facing the lower substrate. The lower substrate includes a first base substrate and a flexible substrate. The flexible substrate has an area larger than an area of the first base substrate. The display panel driver includes a gate driver configured to apply a gate signal to a gate line of the display panel and a data driver configured to apply a data voltage to a data line of the display panel.

18 Claims, 7 Drawing Sheets

(56) References Cited

U.S. PATENT DOCUMENTS

| | | | |
|---|---|---|---|
| 2008/0074567 A1 | 3/2008 | Jeon et al. | |
| 2010/0020053 A1* | 1/2010 | Sah | G09G 3/3648 345/208 |
| 2011/0115782 A1* | 5/2011 | Song | G09G 3/3659 345/213 |
| 2011/0147747 A1 | 6/2011 | Jeon et al. | |
| 2014/0049742 A1* | 2/2014 | Misono | G02F 1/1339 349/153 |
| 2014/0203703 A1* | 7/2014 | Maatta | H01L 23/3121 313/504 |
| 2015/0154898 A1* | 6/2015 | Jung | G09G 3/20 345/206 |
| 2016/0066409 A1* | 3/2016 | Kwon | H05K 1/028 174/254 |
| 2016/0246084 A1* | 8/2016 | Liu | H01L 51/56 |
| 2016/0360625 A1* | 12/2016 | Ogasawara | H05B 33/0803 |
| 2018/0224688 A1* | 8/2018 | Chen | G02F 1/133305 |
| 2019/0018528 A1* | 1/2019 | Higano | G06F 3/0412 |
| 2019/0214588 A1* | 7/2019 | Minami | H01L 51/0097 |

FOREIGN PATENT DOCUMENTS

| | | |
|---|---|---|
| KR | 1020060060869 | 6/2006 |
| KR | 1020080013070 | 2/2008 |
| KR | 1020130026072 | 3/2013 |
| KR | 1020140058733 | 5/2014 |
| WO | 2016/032175 | 3/2016 |

\* cited by examiner

DISPLAY APPARATUS HAVING A REDUCED-WIDTH BEZEL AND METHOD OF MANUFACTURING THE SAME

CROSS-REFERENCE TO RELATED APPLICATION

This application claims priority under 35 U.S.C. § 119 to Korean Patent Application No. 10-2015-0034080, filed on Mar. 11, 2015, in the Korean Intellectual Property Office (KIPO), the contents of which are incorporated by reference herein in their entirety.

TECHNICAL FIELD

Exemplary embodiments of the present inventive concept relate to a display apparatus and to a method of manufacturing the display apparatus. More particularly, exemplary embodiments of the present inventive concept relate to a display apparatus having a reduced width of a bezel and to a method of manufacturing the display apparatus.

DISCUSSION OF THE RELATED ART

A display apparatus may include a display panel and a display panel driver. The display panel may include an active region on which an image is displayed and a peripheral region adjacent to the active region on which no image is displayed.

A pad part may be disposed in the peripheral region. The pad part may connect the display panel driver to the display panel. Alternatively, a portion of the display panel driver may be directly mounted or integrated in the peripheral region. The peripheral region may include a fan out portion.

A width of a bezel of the display apparatus may be vary depending on a size of the peripheral region. When the peripheral region is large, the bezel is wide (e.g., large).

SUMMARY

Exemplary embodiments of the present inventive concept relate to a display apparatus having a narrow bezel obtained by folding a peripheral region of a display panel toward a rear surface of the display panel.

Exemplary embodiments of the present inventive concept relate to a method of manufacturing a display apparatus having a narrow bezel.

In an exemplary embodiment of the present inventive concept, a display apparatus includes a display panel and a display panel driver. The display panel includes a lower substrate and an upper substrate facing the lower substrate. The lower substrate includes a first base substrate and a flexible substrate. The flexible substrate has an area larger than an area of the first base substrate. The display panel driver includes a gate driver configured to apply a gate signal to a gate line of the display panel and a data driver configured to apply a data voltage to a data line of the display panel.

In an exemplary embodiment of the present inventive concept, a portion of the flexible substrate is folded toward a lower surface of the first base substrate.

In an exemplary embodiment of the present inventive concept, the display apparatus further includes a backlight assembly disposed under the first base substrate and configured to provide light to the display panel. The folded portion of the flexible substrate contacts a lower surface of the backlight assembly.

In an exemplary embodiment of the present inventive concept, a data pad part connected to the data driver and a fan out portion of the data line may be disposed on an extended portion of the flexible substrate. The extended portion of the flexible substrate extends outwardly with respect to a side surface of the first base substrate.

In an exemplary embodiment of the present inventive concept, the gate driver includes a gate driving circuit configured to generate the gate signal. The gate driving circuit is disposed on the extended portion of the flexible substrate.

In an exemplary embodiment of the present inventive concept, a gate pad part connected to the gate driver and a fan out portion of the gate line are disposed on the extended portion of the flexible substrate.

In an exemplary embodiment of the present inventive concept, the data driver is adjacent to a first side of the display panel. The gate driver includes a first gate driver adjacent to the first side of the display panel and a second gate driver adjacent to a second side of the display panel.

In an exemplary embodiment of the present inventive concept, the first gate driver is configured to apply the gate signal to a first gate line group. The first gate line group includes gate lines extending from the first side of the display panel in a first direction inclined with respect to the first side. The second gate driver is configured to apply the gate signal to a second gate line group. The second gate line group includes gate lines extending from the second side of the display panel in the first direction.

In an exemplary embodiment of the present inventive concept, at least one gate line, from among the gate lines of the first gate line group, has a zigzag shape. At least one gate line, from among the gate lines of the second gate line group, has a zigzag shape.

In an exemplary embodiment of the present inventive concept, the second side of the display panel is substantially perpendicular to the first side of the display panel.

In an exemplary embodiment of the present inventive concept, the display panel further includes a sacrifice layer disposed between the first base substrate and the flexible substrate.

In an exemplary embodiment of the present inventive concept, the display panel further includes a liquid crystal layer disposed between the flexible substrate and the upper substrate.

In an exemplary embodiment of the present inventive concept, a method of manufacturing a display apparatus includes forming a flexible substrate on a first base substrate. A gate line and a data line are formed on the flexible substrate. An extended portion of the flexible substrate is formed by cutting a portion of the first base substrate. The extended portion of the flexible substrate extends with respect to a side surface of the first base substrate. An upper substrate is formed to face the flexible substrate.

In an exemplary embodiment of the present inventive concept, the method further includes folding the extended portion of the flexible substrate toward a lower surface of the first base substrate.

In an exemplary embodiment of the present inventive concept, the display apparatus further includes a backlight assembly configured to provide light to the first base substrate. The backlight assembly is disposed under the first base substrate. The folded portion of the flexible substrate contacts a lower surface of the backlight assembly.

In an exemplary embodiment of the present inventive concept, the method further includes forming a sacrifice layer on the first base substrate prior to forming the flexible substrate on the first base substrate using a laser.

In an exemplary embodiment of the present inventive concept, the cutting a portion of the first base substrate includes irradiating the irradiated portion of the sacrifice layer corresponding to the cut portion of the first base substrate.

In an exemplary embodiment of the present inventive concept, the method further includes forming a data pad part on the extended portion of the flexible substrate, the data pad part being connected to the data line. A data driver is formed on the data pad part, the data driver being configured to apply a data voltage to the data line.

In an exemplary embodiment of the present inventive concept, the method further includes integrating a gate driving circuit on the extended portion of the flexible substrate, the gate driving circuit being configured to apply a gate signal to the gate line.

In an exemplary embodiment of the present inventive concept, the method further includes forming a gate pad part on the extended portion of the flexible substrate, the gate pad part being connected to the gate line. A gate driver is formed on the gate pad part, the gate driver being configured to apply a gate signal to the gate line.

According to an exemplary embodiment of the present inventive concept, a display apparatus includes a display panel. The display panel includes a flexible substrate. Portions of the display panel, except for a display region of the display panel, are folded toward a rear surface of the display panel. Thus, a width of a bezel of the display apparatus is reduced.

BRIEF DESCRIPTION OF THE DRAWINGS

The above and other features and aspects of the present inventive concept will become more apparent by describing in detailed exemplary embodiments thereof with reference to the accompanying drawings, in which.

DETAILED DESCRIPTION OF THE EMBODIMENTS

The present inventive concept will be explained in detail with reference to the accompanying drawings.

Figure 1:
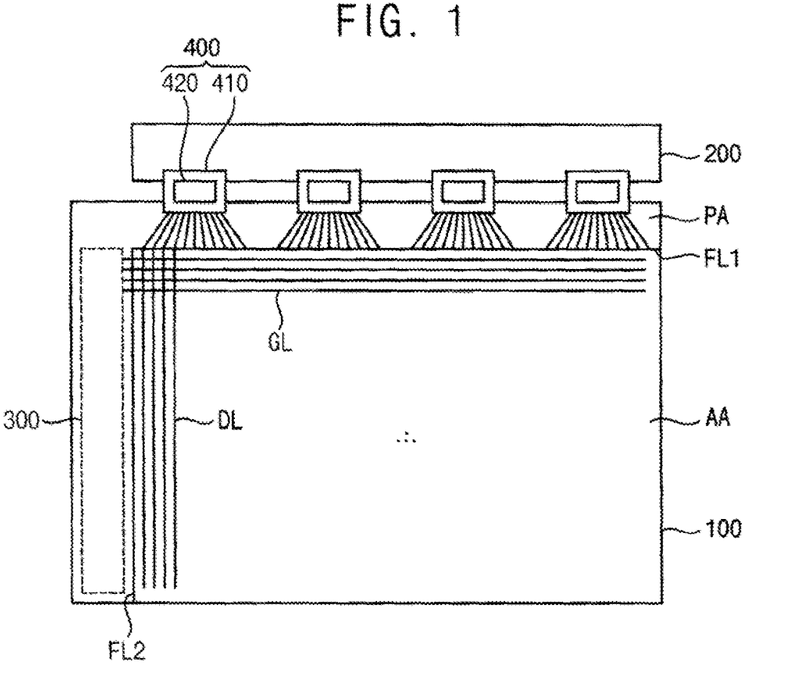
FIG. 1 is a plan view illustrating a display apparatus according to an exemplary embodiment of the present inventive concept.
Figure 2:
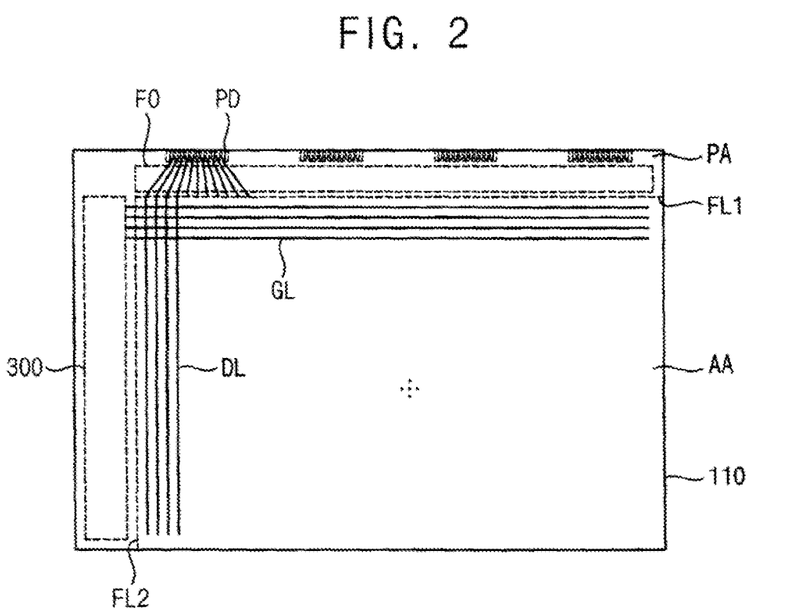
FIG. 2 is a plan view illustrating a lower substrate of the display panel of FIG. 1, according to an exemplary embodiment of the present inventive concept.
Figure 3:
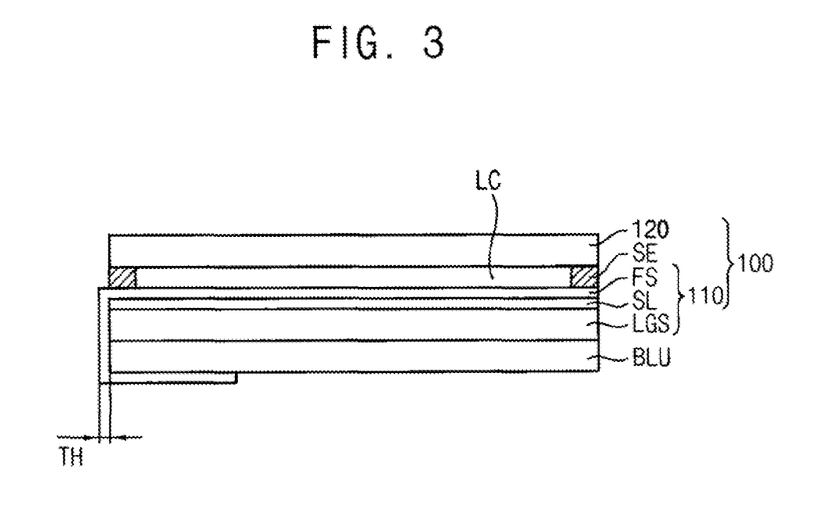
FIG. 3 is a cross-sectional view of the display apparatus illustrated in FIG. 1, according to an exemplary embodiment of the present inventive concept.

FIG. 1 is a plan view illustrating a display apparatus according to an exemplary embodiment of the present inventive concept. FIG. 2 is a plan view illustrating a lower substrate 110 of a display panel 100 of FIG. 1, according to an exemplary embodiment of the present inventive concept. FIG. 3 is a cross-sectional view of the display apparatus illustrated in FIG. 1, according to an exemplary embodiment of the present inventive concept.

Referring to FIGS. 1 to 3, the display apparatus may include a display panel 100 and a display panel driver.

The display panel driver may include a printed circuit board (PCB) 200, a gate driver 300 and a data driver 400. A timing controller and a power voltage generator may be disposed on the PCB 200.

According to an exemplary embodiment of the present inventive concept, the data driver 400 may include a plurality of data driving chips 420. Each data driving chip 420, from among the plurality of data driving chips 420, may be disposed on a corresponding data flexible printed circuit board (FPCB) 410. The data FPCB 410 may connect the PCB 200 to the display panel 100.

In an exemplary embodiment of the present inventive concept, the gate driver 300 is integrated on a peripheral region PA of the display panel 100.

According to an exemplary embodiment of the present inventive concept, the display panel 100 includes an active region AA on which an image may be displayed and a peripheral region PA adjacent to the active region AA. The peripheral region PA does not display an image. The active region AA may be referred to as a display region.

The display panel 100 may include a plurality of gate lines GL and a plurality of data lines DL. The display panel 100 may include a plurality of pixels. The pixels may be electrically connected to the gate lines GL and the data lines DL. The gate lines GL, the data lines DL and the pixels may be disposed in the active region AA of the display panel 100.

Each pixel may include a switching element, a liquid crystal capacitor, and a storage capacitor. The liquid crystal capacitor and the storage capacitor of a pixel may be electrically connected to the switching element of the pixel. The pixels may be arranged in a matrix form.

A data pad part PD connected to the data driver 400 and a fan out portion FO of the data line DL may be disposed in the peripheral region PA.

The timing controller may receive input image data and an input control signal from an external apparatus. The input image data may include red image data, green image data and blue image data. The input control signal may include a master clock signal and a data enable signal. The input control signal may further include a vertical synchronizing signal and a horizontal synchronizing signal.

The timing controller may generate a first control signal, a second control signal and a data signal based on the input image data and the input control signal.

The timing controller may generate the first control signal for controlling an operation of the gate driver 300 based on the input control signal. The timing controller may output the first control signal to the gate driver 300.

The timing controller may generate a second control signal for controlling an operation of the data driver 400 based on the input control signal. The timing controller may output the second control signal to the data driver 400.

The timing controller may generate a data signal based on the input image data. The timing controller may output the data signal to the data driver 400.

The gate driver 300 may generate gate signals driving the gate lines GL in response to the first control signal received from the timing controller. The gate driver 300 may sequentially output the gate signals to the gate lines GL.

The data driver 400 may receive the second control signal and the data signal from the timing controller. The data driver 400 may convert the data signal into analog data voltages. The data driver 400 may output the data voltages to the data lines DL.

According to an exemplary embodiment of the present inventive concept, the display panel 100 includes a lower substrate 110 and an upper substrate 120 facing the lower substrate 110.

The lower substrate 110 may include a first base substrate LGS and a flexible substrate FS disposed on the first base substrate LGS. The flexible substrate FS may have an area larger than an area of the first base substrate LGS.

According to an exemplary embodiment of the present inventive concept, the flexible substrate FS may include, for example, polyimide.

A liquid crystal layer LC may be disposed between the flexible substrate FS and the upper substrate 120. A sealing member SE may be disposed at end portions of the liquid crystal layer LC.

According to an exemplary embodiment of the present inventive concept, the lower substrate 110 may be, for example, an array substrate. The gate lines GL and the data lines DL may be disposed on the lower substrate 110. A plurality of switching elements connected to the gate lines GL and the data lines DL may be disposed on the lower substrate 110. A pixel electrode may be disposed on the lower substrate 110.

The upper substrate 120 may face the lower substrate 110. A common electrode facing the pixel electrode may be disposed under the upper substrate 120. A color filter defining a color of a pixel, from among the plurality of pixels, may be disposed under the upper substrate 120.

An overlap area between the lower substrate 110 and the upper substrate 120 may be substantially the same as the active region AA of the display panel 100. Alternatively, the overlap area between the lower substrate 110 and the upper substrate 120, excluding the area occupied by the sealing member SE, may be defined by the active region AA of the display panel 100.

According to an exemplary embodiment of the present inventive concept, the flexible substrate FS of the lower substrate 110 has an area larger than an area of the first base substrate LGS of the lower substrate 110. For example, the flexible substrate FS may have an extended portion extending along a side surface of the first base substrate LGS. A surface area of the extended portion of the flexible substrate FS may be substantially the same as a surface area of the peripheral region PA of the display panel 100.

According to an exemplary embodiment of the present inventive concept, the extended portion of the flexible substrate FS may be folded toward a rear surface of the first base substrate LGS. The extended portion of the flexible substrate FS may be folded along a first folding line FL1 and a second folding line FL2 as illustrated in FIGS. 1 and 2. The first folding line FL1 may be a boundary between the data fan out portion FO and the active region AA. The second folding line FL2 may be a boundary between the gate driver 300 and the active region AA.

In FIG. 2, an area defined by an outermost line enclosing the peripheral area PA may be substantially the same as an area of the flexible substrate FS which is not folded. An inner area defined by the first folding line FL1 and the second folding line FL2 may be substantially the same as an area of the upper substrate 120.

The display apparatus may further include a backlight assembly BLU disposed under the first base substrate LGS to provide light to the display panel 100. The folded portion of the flexible substrate FS may make contact with a lower surface of the backlight assembly BLU.

The data pad part PD, which is connected to the data driver 400, and the fan out portion FO of the data line DL may be disposed on the extended portion of the flexible substrate FS.

A gate driving circuit 300 (e.g., the gate driver 300), which may generate a gate signal, may be integrated on the extended portion of the flexible substrate FS.

The display panel 100 may further include a sacrifice layer SL disposed between the first base substrate LGS and the flexible substrate FS. The sacrifice layer SL may include, for example, an amorphous silicon (a-Si:H).

FIGS. 4A to 4F are cross-sectional views illustrating a method of manufacturing the display apparatus of FIG. 1.

A method of manufacturing the display apparatus is described below with reference to FIGS. 1 to 4F, according to an exemplary embodiment of the present inventive concept.

Figure 4A:
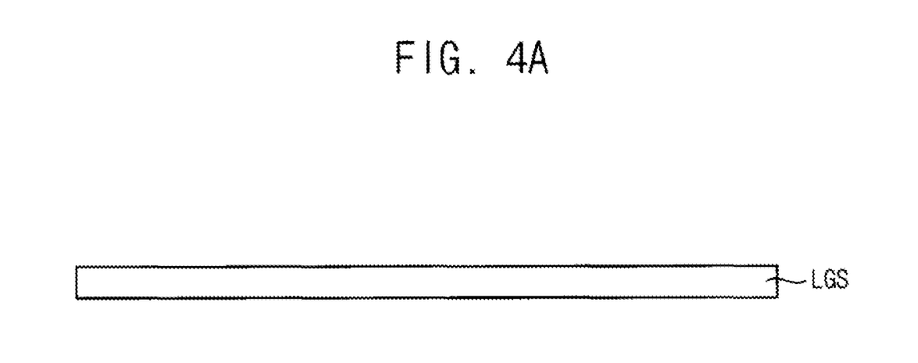
FIGS. 4A to 4F are cross-sectional views illustrating a method of manufacturing the display apparatus of FIG. 1, according to an exemplary embodiment of the present inventive concept.

According to an exemplary embodiment of the present inventive concept, referring to FIG. 4A, the first base substrate LGS is prepared (e.g., provided).

Figure 4B:
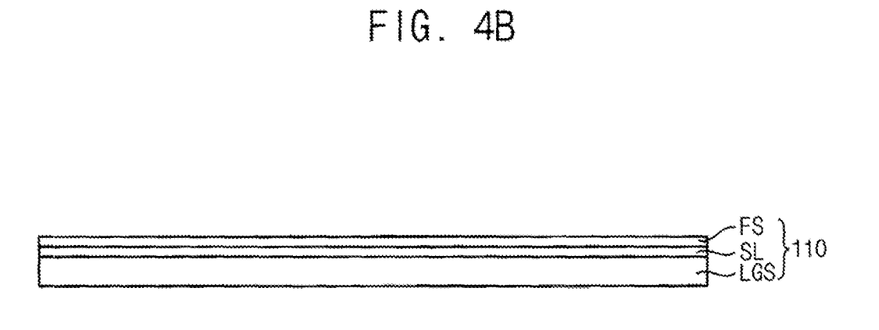

Referring to FIG. 4B, the flexible substrate FS may be formed on the first base substrate LGS. Prior to forming the flexible substrate FS on the first base substrate LGS, the sacrifice layer SL may be formed on the first base substrate LGS. The flexible substrate FS may include polyimide. The sacrifice layer may include amorphous silicon (a-Si:H).

In FIG. 4B, an area of the flexible substrate FS may be substantially the same as an area of the first base substrate LGS.

Referring to FIGS. 2 and 4B, a plurality of gate lines GL and a plurality of data lines DL may be formed on the flexible substrate FS. A plurality of switching elements may be formed on the flexible substrate FS. Each switching element, from among the plurality of switching elements may be connected to a corresponding gate line GL and data line DL. A plurality of pixel electrodes may be formed on the flexible substrate FS. Each pixel electrode, from among the plurality of pixel electrodes, may be connected to a corresponding switching element.

According to an exemplary embodiment of the present inventive concept, when the data lines DL are formed, a fan out portion FO of the data lines DL may be formed.

The gate driving circuit 300 may be integrated on the flexible substrate FS according to an exemplary embodiment of the present inventive concept.

A data pad part PD may be formed in an upper portion of the fan out portion FO. Each pad of the data pad part PD may be connected to a corresponding data line DL. Each pad of the data pad part PD may be connected to a pad of a data driving chip 420.

Figure 4C:
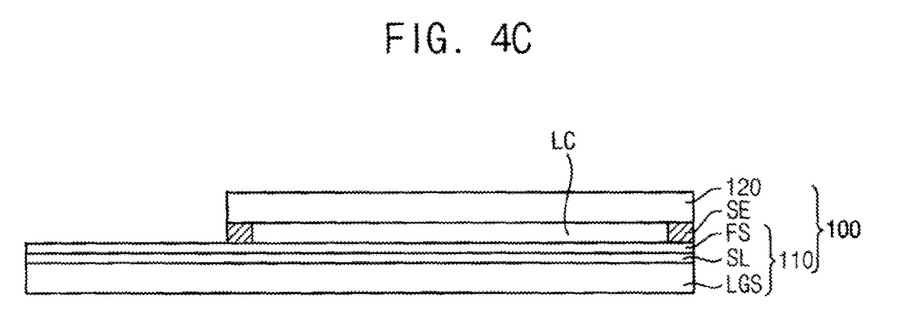

Referring to FIG. 4C, an upper substrate 120 may be formed to face the flexible substrate FS. A liquid crystal layer LC may be formed between the flexible substrate FS and the upper substrate 120. The liquid crystal layer LC may be injected between the flexible substrate FS and the upper substrate 120. The liquid crystal layer LC may be sealed using a sealing member SE.

Figure 4D:
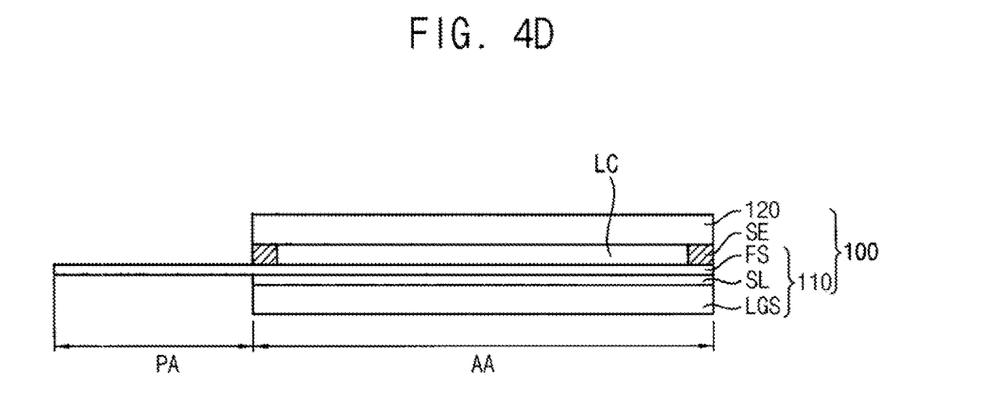

According to an exemplary embodiment of the present inventive concept, referring to FIG. 4D, a portion of the first base substrate LGS may be cut. Accordingly, an extended portion of the flexible substrate FS may extend with respect to a side surface (e.g., the cut side surface) of the first base substrate LGS.

When cutting the portion of the first base substrate LGS, a portion of the sacrifice layer SL which corresponds to the cut portion of the first base substrate LGS may be irradiated by a laser.

When irradiated by the laser, a physical property of the sacrifice layer SL may be changed to allow the cut portion of the first base substrate LGS to be detached from the flexible substrate FS.

Figure 4E:
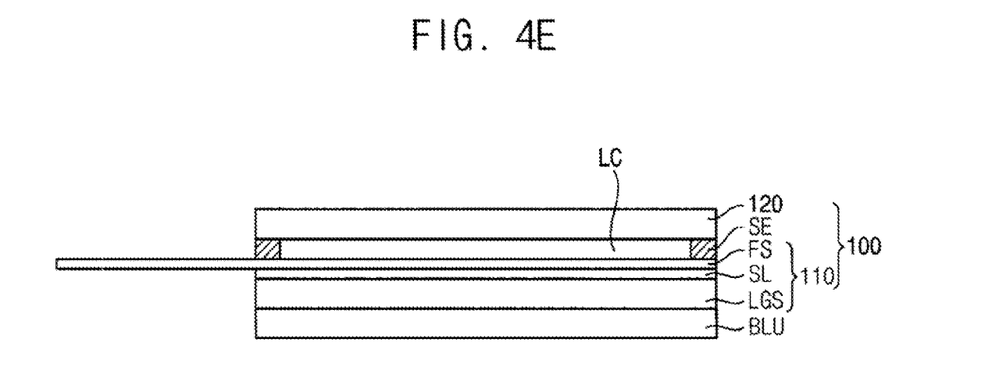

According to an exemplary embodiment of the present inventive concept, referring to FIG. 4E, a backlight assembly BLU providing light toward the first base substrate LGS may be disposed under the first base substrate LGS.

Figure 4F:
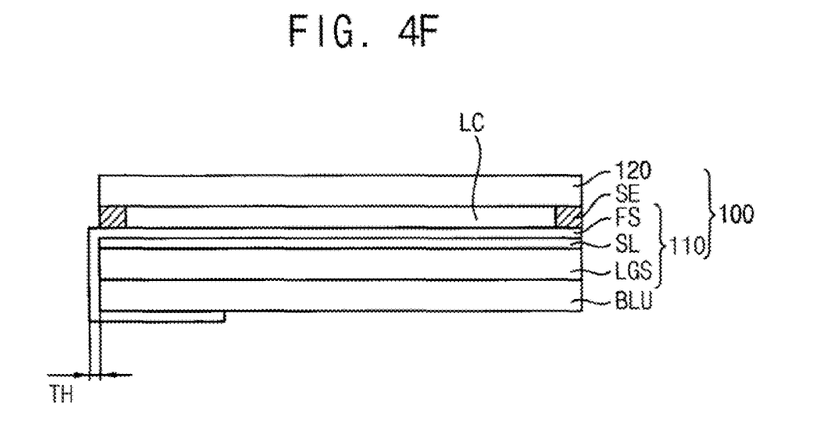

According to an exemplary embodiment of the present inventive concept, referring to FIG. 4F, the extended portion of the flexible substrate FS may be folded so the folded portion of the flexible substrate FS may make contact with a lower surface of the backlight assembly BLU.

According to an exemplary embodiment of the present inventive concept, the data pad part PD connected to the data driver 400, the fan out portion FO of the data line DL and the gate driver 300 are formed on the extended portion of the flexible substrate FS. The extended portion of the flexible substrate FS may be folded toward the lower surface of the first base substrate LGS. Thus, the active region AA may remain on an upper surface of the display panel 100. Accordingly, a width of a bezel of the display device may be reduced. According to an exemplary embodiment of the present inventive concept, referring to FIG. 4F, a thickness TH of the flexible substrate may extend from an overlap area between the lower substrate 110 and the upper substrate 120 in a cross-sectional view of the display device.

Figure 5:
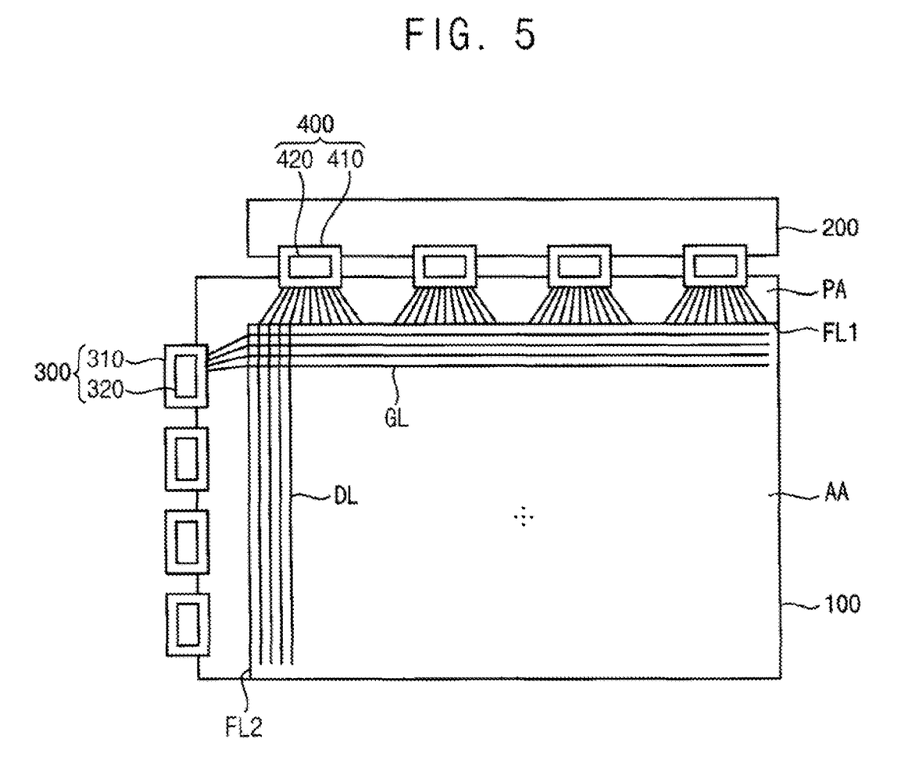
FIG. 5 is a plan view illustrating a display apparatus according to an exemplary embodiment of the present inventive concept.
Figure 6:
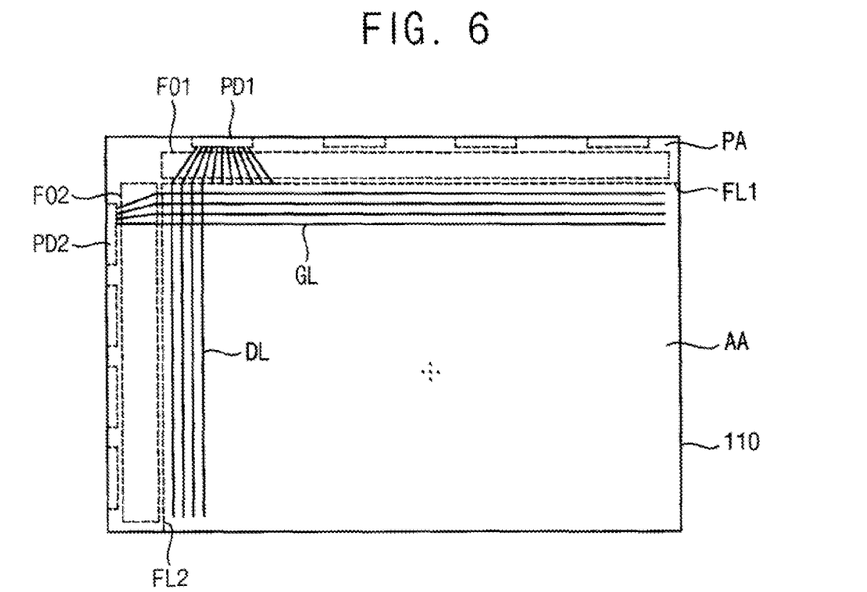
FIG. 6 is a plan view illustrating a lower substrate of a display panel illustrated in FIG. 5, according to an exemplary embodiment of the present inventive concept.

FIG. 5 is a plan view illustrating a display apparatus according to an exemplary embodiment of the present inventive concept. FIG. 6 is a plan view illustrating a lower substrate 110 of a display panel 100 of FIG. 5, according to an exemplary embodiment of the present inventive concept.

With the exception of a structure of a gate driver, a display apparatus and a method of manufacturing the display apparatus, according to an exemplary embodiment of the present inventive concept, may be substantially the same as the display apparatus and the method of manufacturing the display apparatus disclosed above with reference to FIGS. 1 to 4F. Thus, the same reference numerals may be used to refer to the same or like elements as those described in the previous exemplary embodiments of the present inventive concept with reference to FIGS. 1 to 4F. A repetitive description of elements already described may be omitted for brevity.

Referring to FIGS. 5 and 6, a display apparatus may include a display panel 100 and a display panel driver, according to an exemplary embodiment of the present inventive concept.

The display panel driver may include a PCB 200, a gate driver 300 and a data driver 400. A timing controller and a power voltage generator may be disposed on the PCB 200.

The data driver 400 may include a plurality of data driving chips 420. The plurality of data driving chips 420 may be disposed on a corresponding data FPCB 410. The data FPCB 410 may connect a PCB 200 to a peripheral region PA of the display panel 100.

According to an exemplary embodiment of the present inventive concept, the gate driver 300 may include a plurality of gate driving chips 320. The plurality of gate driving chips 320 may be disposed on a corresponding gate FPCB 310. The gate FPCB 310 may be connected to the peripheral region PA of the display panel 100.

The display panel 100 may include an active region AA on which an image may be displayed and a peripheral region PA adjacent to the active region AA. The peripheral region PA does not display an image. The active region AA may be referred to as a display region.

The display panel 100 may include a plurality of gate lines GL and a plurality of data lines DL. The display panel 100 may include a plurality of pixels. The pixels may be electrically connected to corresponding gate lines GL and data lines DL. The gate lines GL, the data lines DL and the pixels may be disposed in the active region AA of the display panel 100.

According to an exemplary embodiment of the present inventive concept, a data pad part PD1 connected to a data driver 400 and a fan out portion FO1 of the data lines DL may be disposed in the peripheral region PA.

According to an exemplary embodiment of the present inventive concept, a gate pad part PD2 connected to a gate driver 300 and a fan out portion FO2 of the gate lines GL may be disposed in the peripheral area PA.

According to an exemplary embodiment of the present inventive concept, the display panel 100 may include a lower substrate 110 and an upper substrate 120 facing the lower substrate 110.

The lower substrate 110 may include a first base substrate LGS and a flexible substrate FS disposed on the first base substrate LGS. The flexible substrate FS may have an area larger than an area of the first base substrate LGS.

An overlap area between the lower substrate 110 and the upper substrate 120 may be substantially the same as an active region AA of the display panel 100. Alternatively, the overlap area between the lower substrate 110 and the upper substrate 120, excluding the area occupied by the sealing member SE, may be defined by the active region AA of the display panel 100.

According to an exemplary embodiment of the present inventive concept, the flexible substrate FS of the lower substrate 110 has an area larger than an area of the first base substrate LGS of the lower substrate 110. Thus, the flexible substrate FS may have an extended portion extending along a side surface of the first base substrate LGS. A surface area of the extended portion of the flexible substrate FS may be substantially same as a surface area of the peripheral region PA of the display panel 100.

According to an exemplary embodiment of the present inventive concept, the extended portion of the flexible substrate FS may be folded toward a rear surface of the first base substrate LGS. The extended portion of the flexible substrate FS may be folded along a first folding line FL1 and a second folding line FL2 as illustrated in FIGS. 1 and 2. The first folding line FL1 may be a boundary between the data fan out portion FO and the active region AA. The second folding line FL2 may be a boundary between the gate driver 300 and the active region AA.

According to an exemplary embodiment of the present inventive concept, the data pad part PD1 connected to the data driver 400, the fan out portion FO1 of the data line DL, the gate pad part PD2 connected to the gate driver 300 and the fan out portion FO2 of the gate line GL may be formed on the extended portion of the flexible substrate FS. The extended portion of the flexible substrate FS may be folded toward a lower surface of the first base substrate LGS. Thus, the active region AA remains on an upper surface of the display panel 100. Accordingly, a width of a bezel of the display device may be reduced.

Figure 7:
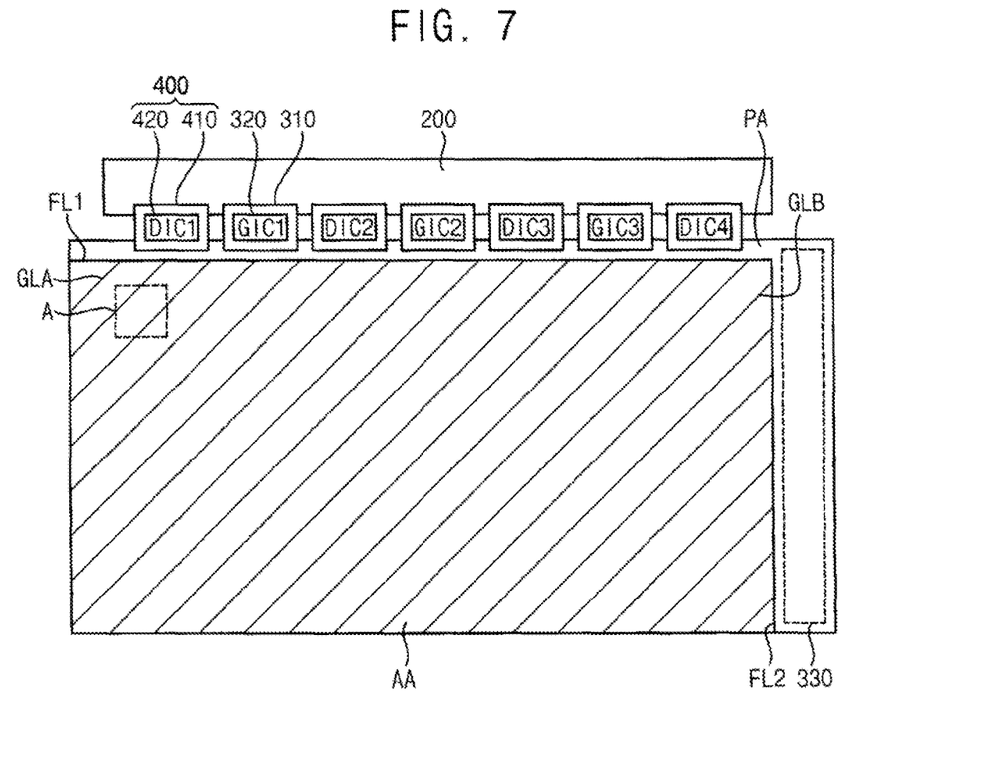
FIG. 7 is a plan view illustrating a display apparatus according to an exemplary embodiment of the present inventive concept.
Figure 8:
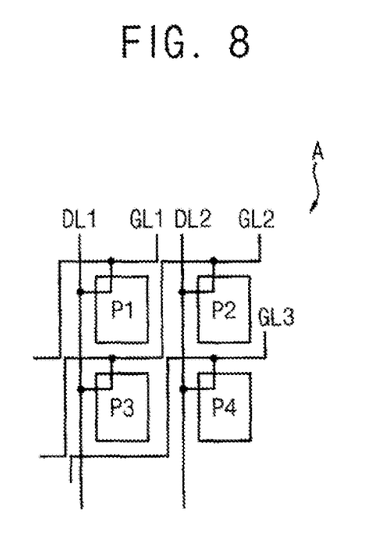
FIG. 8 is a plan view illustrating a portion A of the display panel illustrated in FIG. 7, according to an exemplary embodiment of the present inventive concept.

FIG. 7 is a plan view illustrating a display apparatus according to an exemplary embodiment of the present inventive concept. FIG. 8 is a plan view illustrating a portion A of the display panel illustrated in FIG. 7, according to an exemplary embodiment of the present inventive concept.

With the exception of a structure of a gate driver, a display apparatus and a method of manufacturing the display apparatus, according to an exemplary embodiment of the present inventive concept, may be substantially the same as the display apparatus and the method of manufacturing the display apparatus disclosed above with reference to FIGS. 1 to 4F. Thus, the same reference numerals may be used to refer to the same or like elements as those described in the previous exemplary embodiments of the present inventive concept with reference to FIGS. 1 to 4F. A repetitive description of elements already described may be omitted for brevity.

Referring to FIGS. 7 and 8, a display apparatus may include a display panel 100 and a display panel driver according to an exemplary embodiment of the present inventive concept.

The display panel driver may include a PCB 200, a gate driver 300 and a data driver 400. A timing controller and a power voltage generator may be disposed on the PCB 200.

The data driver 400 may be disposed adjacent to a first side of the display panel 100.

The data driver 400 may include a plurality of data driving chips 420. The plurality of data driving chips 420 may be disposed on a corresponding data FPCB 410. The data FPCB 410 may connect a PCB 200 to a peripheral region PA of the display panel 100.

A data pad part connected to the data driver 400 and a fan out portion of data lines DL may be disposed in the peripheral region PA of the display panel 100.

The gate driver 300 may include a first gate driver 310 and 320 disposed adjacent to the first side of the display panel 100 and a second gate driver 330 disposed adjacent to a second side of the display panel 100.

According to an exemplary embodiment of the present inventive concept, the first gate driver 310 and 320 may include a plurality of gate driving chips 320. The plurality of gate driving chips 320 may be disposed on a corresponding gate FPCB 310. The gate FPCB 310 may be connected to the peripheral region PA of the display panel 100.

A gate pad part connected to the first gate driver 310 and 320 and a fan out portion of gate lines GL may be disposed in the peripheral area PA.

According to an exemplary embodiment of the present inventive concept, the second gate driver 330 may be integrated on the peripheral region PA of the display panel 100.

The first gate driver 310 and 320 may apply a gate signal to a first gate line group extending from a first side of the display panel 100 in a first direction which may be inclined with respect to the first side. The first gate line group may include gate lines from a gate line GLA to a gate line GLB but may exclude the gate line GLB. For example, the first gate line group includes all the gate lines disposed between the gate lines GLA and GLB, including the gate line GLA and excluding the gate line GLB.

The second gate driver 330 may apply a gate signal to a second gate line group extending from a second side of the display panel 100 in the first direction. The second gate line group may include the gate line GLB and gate lines under the gate line GLB.

The second side of the display panel 100 may be perpendicular to the first side of the display panel 100. Alternatively, the second side of the display panel 100 may face (e.g., be parallel to) the first side of the display panel 100. When the second side of the display panel 100 faces the first side of the display panel 100, a direction of applying the gate signal to the first gate line group may be opposite to a direction of applying the gate signal to the second gate line group when the first and second sides of the display panel 100 are substantially perpendicular to each other, according to an exemplary embodiment of the present inventive concept.

According to an exemplary embodiment of the present inventive concept, the first and second gate line groups extending along the inclined direction may have a step shape. For example, the gate lines of the first gate line group and the gate lines of the second gate line group may have step shapes as shown in FIG. 8. According to an exemplary embodiment of the present inventive concept, the first and second gate line groups extend in an overall inclined direction with respect to a side of the display panel 100, but the overall inclined direction in which the first and second gate line groups extend includes gate line components forming substantially perpendicular angles with respect to each other. For example, a line passing through points where the gate line components connect extends in an overall inclined direction with respect to a side of the display panel 100. Thus, the gate lines of the first and second line groups may have zigzag shapes.

According to an exemplary embodiment of the present inventive concept, in FIG. 8, a first pixel P1 is connected to a first data line DL1 extending in a vertical direction and a first gate line GL1 extending in a step shape. A second pixel P2 may be connected to a second data line DL2 extending in the vertical direction and a second gate line GL2 extending in a step shape. A third pixel P3 may be connected to the first data line DL1 extending in the vertical direction and the second gate line GL2 extending in a step shape. A fourth pixel P4 may be connected to second first data line DL2 extending in the vertical direction and a third gate line GL3 extending in a step shape.

Although in an exemplary embodiment of the present inventive concept the first gate driver 310 and 320 may include a plurality of gate driving chips 320 and the first gate driver 310 and 320 may be connected to the peripheral region PA of the display panel 100, the present inventive concept is not limited thereto. For example, according to an exemplary embodiment of the present inventive concept, the first gate driver 310 and 320 may be integrated on the peripheral region PA of the display panel 100 as shown in FIG. 1.

Although in an exemplary embodiment of the present inventive concept the second gate driver 330 is integrated on the peripheral region PA of the display panel 100 adjacent to the second side of the display panel 100, the gate driver 330 may be disposed in other locations of the display panel 100 and may include different structures. For example, according to an exemplary embodiment of the present inventive concept, the second gate driver 330 may include a plurality of driving chips and may be connected to the peripheral region PA of the display panel 100 similar to the approach of the first gate driver 310 and 320.

Although in some exemplary embodiments of the present inventive concept a display device may feature four data driving chips 420 and three gate driving chips 320, the number of data driving chips 420 and gate driving chips 320 is not limited thereto. For example, in exemplary embodiments of the present inventive concept, a display device may include at least one data driving chip 420 and at least one gate driving chip 320.

According to an approach, a display apparatus may include a first gate driver but would not include a second gate driver. The first gate driver of the display apparatus may be disposed adjacent to a first side of the display apparatus. The first side of the display apparatus may correspond to the first side of the display panel 100. Gate lines of the display apparatus may extend in an inclined direction. An area of the display apparatus corresponding to an area occupied by first gate line group illustrated FIG. 7 is driven by the inclined gate lines. However, an area corresponding to the second gate line group illustrated in FIG. 7 is driven by both of vertical gate lines and inclined gate lines connected to the vertical gate lines. Therefore, the resistive-capacitive (RC) delay of the area of the display apparatus corresponding to the second gate line group is different from the RC delay of the area of the display apparatus corresponding to the first gate line group. Accordingly, a difference of the RC delay at the boundary of the area corresponding to the first gate line group and the area corresponding to the second gate line group exists in the display apparatus. Due to the difference of the RC delay, the boundary of the area corresponding to the first gate line group and the area corresponding to the second gate line group of the display apparatus is displayed to a user.

According to an exemplary embodiment of the present inventive concept, the gate driver 300 may include the first gate driver 310 and 320 disposed adjacent to the first side of the display panel 100 to drive the first gate line group and the second gate driver 330 disposed adjacent to the second side of the display panel 100 to drive the second gate line group. Accordingly, a boundary between the area corresponding to the first gate line group and the area corresponding to the second gate line group might not be visible to a user. Thus, the display quality of the display apparatus may be increased.

According to an exemplary embodiment of the present inventive concept, an extended portion of the flexible substrate FS on which the first gate driver 310 and 320 and the data driver 400 are formed may be folded along the first folding line FL1. An extended portion of the flexible substrate FS on which the second gate driver 330 is formed may be folded along the second folding line FL2. Thus, the active region AA may remain on an upper surface of the display panel 100. Accordingly, the display apparatus may have a narrow bezel.

Figure 9:
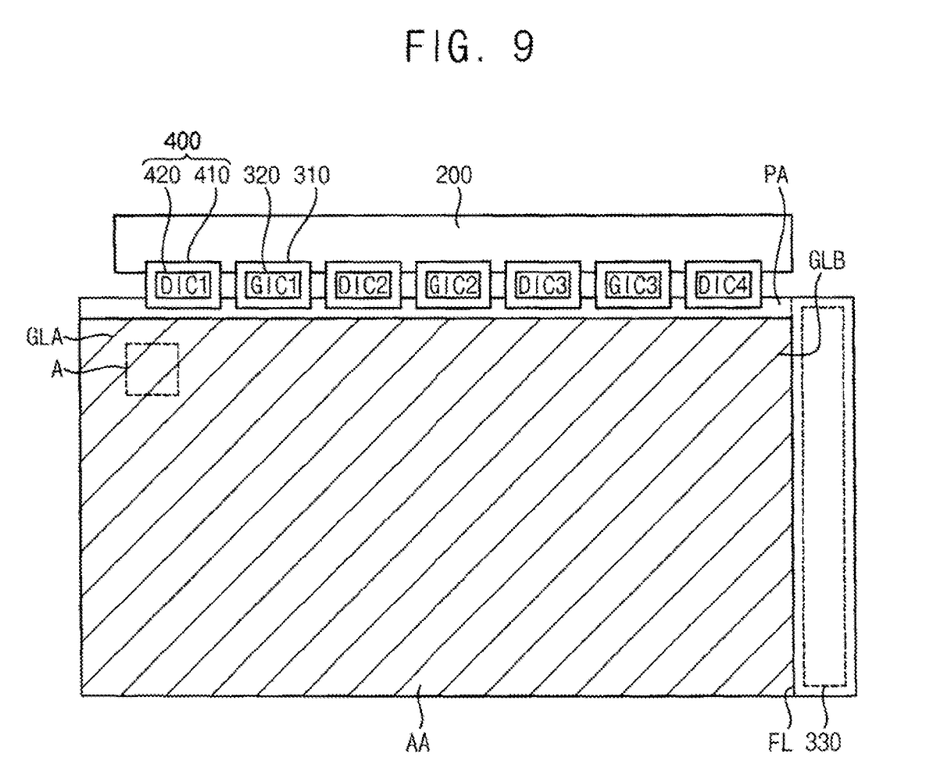
FIG. 9 is a plan view illustrating a display apparatus according to an exemplary embodiment of the present inventive concept.

FIG. 9 is a plan view illustrating a display apparatus according to an exemplary embodiment of the present inventive concept.

With the exception of a folded portion of the flexible substrate, a display apparatus and a method of manufacturing the display apparatus, according to an exemplary embodiment of the present inventive concept, may be substantially the same as the display apparatus and the method of manufacturing the display apparatus disclosed above with reference to FIGS. 7 and 8. Thus, the same reference numerals may be used to refer to the same or like parts as those described above with reference to FIGS. 7 and 8. A repetitive description of elements already described may be omitted for brevity.

Referring to FIGS. 8 and 9, a display apparatus may include a display panel 100 and a display panel driver.

The display panel driver may include a PCB 200, a gate driver 300 and a data driver 400. A timing controller and a power voltage generator may be disposed on the PCB 200.

The data driver 400 may be disposed adjacent to a first side of the display panel 100.

The data driver 400 may include a plurality of data driving chips 420. The plurality of data driving chips 420 may be disposed on a corresponding data FPCB 410. The data FPCB 410 may connect a PCB 200 to a peripheral region PA of the display panel 100.

A data pad part connected to the data driver 400 and a fan out portion of the data line DL may be disposed in the peripheral region PA of the display panel 100.

The gate driver 300 may include a first gate driver 310 and 320 disposed adjacent to a first side of the display panel 100 and a second gate driver 330 disposed adjacent to a second side of the display panel.

In an exemplary embodiment of the present inventive concept, the first gate driver 310 and 320 may include a plurality of gate driving chips 320. The plurality of gate driving chips 320 may be disposed on a corresponding gate FPCB 310. The gate FPCB 310 may be connected to the peripheral region PA of the display panel 100.

A gate pad part connected to the first gate driver 310 and 320 and a fan out portion of the gate line GL may be disposed in the peripheral region PA of the display panel 100.

In an exemplary embodiment of the present inventive concept, the second gate driver 330 may be integrated on the peripheral region PA of the display panel 100.

The first gate driver 310 and 320 may apply the gate signal to a first gate line group extending from the first side of the display panel 100 in a first direction which is inclined with respect to the first side of the display panel 100. The first gate line group may include gate lines from a gate line GLA to a gate line GLB but not the gate line GLB. For example, the first gate line group includes all the gate lines disposed between the gate lines GLA and GLB, including the gate line GLA and excluding the gate line GLB.

The second gate driver 330 may apply the gate signal to a second gate line group extending from the second side of the display panel 100 in the first direction. The second gate line group may include the gate line GLB and gate lines under the gate line GLB.

In an exemplary embodiment of the present inventive concept, the first and second gate line groups extending along the inclined direction may have a step shape. For example, the gate lines of the first gate line group and the gate lines of the second gate line group may have step shapes as shown in FIG. 8. According to an exemplary embodiment of the present inventive concept, the first and second gate line groups extend in an overall inclined direction with respect to a side of the display panel 100, but the overall inclined direction in which the first and second gate line groups extend includes gate line components forming substantially perpendicular angles with respect to each other. For example, a line passing through points where the gate line components connect extends in an overall inclined direction with respect to a side of the display panel 100. Thus, the gate lines of the first and second line groups may have zigzag shapes.

According to an approach, a display apparatus may include a gate driver adjacent to a first side of the display apparatus corresponding to the first side of the display panel 100, and gate lines extending in an inclined direction with respect to the first side of the display apparatus. The display apparatus does not include a second gate driver adjacent to a second side of the display apparatus corresponding to the second side of the display panel 100. An area of the display apparatus corresponding to an area occupied by first gate line group illustrated FIG. 9 is driven by the inclined gate lines. However, in the display apparatus, an area corresponding to the second gate line group illustrated in FIG. 9 is driven by both vertical gate lines and inclined gate lines connected to the vertical gate lines. Therefore, RC delay of the area of the display apparatus corresponding to the second gate line group is different from RC delay of the area of the display apparatus corresponding to the first gate line group. Accordingly, in the display apparatus, a difference of the RC delay at the boundary of the area of the display apparatus corresponding to the first gate line group and the area of the display apparatus corresponding to the second gate line group exists. Due to the difference of the RC delay, the boundary of the area of the display apparatus corresponding to the first gate line group and the area of the display apparatus corresponding to the second gate line group is displayed to a user in the display apparatus.

According to an exemplary embodiment of the present inventive concept, the gate driver 300 may include the first gate driver 310 and 320 disposed adjacent to the first side of the display panel 100 to drive the first gate line group and the second gate driver 330 disposed adjacent to the second side of the display panel 100 to drive the second gate line group. Accordingly, a boundary between the area corresponding to the first gate line group and the area corresponding to the second gate line group might not be visible to a user. Thus, the display quality of the display apparatus may be increased.

According to an exemplary embodiment of the present inventive concept an extended portion of the flexible substrate FS on which the second gate driver 330 is formed may be folded along a folding line FL. Thus, a width of a bezel need not increase by adding the second gate driver 330 to a display apparatus.

According to an exemplary embodiment of the present inventive concept, as described above, a flexible substrate may be formed on a lower substrate, and a portion of the flexible substrate on which the display panel driver, the fan out portion and the pad part are formed on may be folded toward the rear surface of the lower substrate. Thus, a width of a bezel of a display apparatus may be reduced.

The foregoing is illustrative of the present inventive concept and is not to be construed as limiting the present inventive concept to the disclosed exemplary embodiments thereof. Although exemplary embodiments of the present inventive concept have been described, those skilled in the art will readily appreciate that many modifications may be made to the disclosed exemplary embodiments without departing from the scope of the present inventive concept. Accordingly, all such modifications are intended to be included within the scope of the present inventive concept as defined in the claims.

What is claimed is:

1. A display apparatus comprising:
    a display panel comprising an active region, a lower substrate and an upper substrate facing the lower substrate, the lower substrate including a first base substrate and a flexible substrate, the flexible substrate having an area larger than an area of the first base substrate such that the flexible substrate extends along an entirety of the first base substrate and additionally extends beyond the first base substrate; and
    a display panel driver comprising: a gate driver configured to apply a gate signal to a gate line of the display panel; and a data driver configured to apply a data voltage to a data line of the display panel,
    wherein the flexible substrate exclusively includes two folding lines including a first folding line and a second folding line, wherein the flexible substrate is folded along the first folding line so as to dispose the gate driver behind the active region of the first base substrate, and
    wherein the second folding line extends in a direction that is perpendicular to a direction of extension of the first folding line, wherein the flexible substrate is folded along the second folding line so as to dispose the data driver behind the active region of the first base substrate.

2. The display apparatus of claim 1, wherein the display panel further comprises a sacrifice layer having a plane that is parallel to a plane of the first base substrate and parallel to a plane of the flexible substrate, and the sacrificial layer is disposed between the first base substrate and the flexible substrate.

3. The display apparatus of claim 1, wherein a data pad part connected to the data driver and a fan out portion of the data line are disposed on an extended portion of the flexible substrate, the extended portion of the flexible substrate extending outwardly with respect to a side surface of the first base substrate.

4. The display apparatus of claim 3, wherein the gate driver includes a gate driving circuit configured to generate the gate signal, and
    wherein the gate driving circuit is disposed on the extended portion of the flexible substrate.

5. The display apparatus of claim 3, wherein a gate pad pd part connected to the gate driver and a fan out portion of the gate line are disposed on the extended portion of the flexible substrate.

6. The display apparatus of claim 1, wherein the data driver is adjacent to a first side of the display panel, and
    the gate driver includes a first gate driver adjacent to the first side of the display panel and a second gate driver adjacent to a second side of the display panel.

7. The display apparatus of claim 6, wherein the first gate driver is configured to apply the gate signal to a first gate line group, the first gate line group including gate lines extending from the first side of the display panel in a first direction inclined with respect to the first side, and
    the second gate driver is configured to apply the gate signal to a second gate line group, the second gate line group including gate lines extending from the second side of the display panel in the first direction.

8. The display apparatus of claim 7, wherein at least one gate line, from among the gate lines of the first gate line group, has a zigzag shape, and at least one gate line, from among the gate lines of the second gate line group, has a zigzag shape.

9. The display apparatus of claim 7, wherein the data line extends in a direction that is substantially parallel to the second side of the display panel.

10. The display apparatus of claim 6, wherein the second side of the display panel is substantially perpendicular to the first side of the display panel.

11. The display apparatus of claim 1, wherein the display panel further comprises a liquid crystal layer disposed between the flexible substrate and the upper substrate.

12. A display apparatus comprising:
a display panel comprising a lower substrate and an upper substrate facing the lower substrate, the lower substrate including a first base substrate and a flexible substrate;
a plurality of pixels disposed in an active region of the display panel, the plurality of pixels comprising a first pixel and a second pixel;
a display panel driver comprising: a plurality of first gate drivers configured to apply gate signals to a first group of pixels of the plurality of pixels through a plurality of first gate lines; a second gate driver configured to apply gate signals to a second group of pixels of the plurality of pixels through a plurality of second gate lines; and a plurality of data drivers configured to apply data signals to the first and second groups of pixels through a plurality of data lines,
wherein the first group of pixels is not connected to the second gate driver,
wherein the flexible substrate includes a first side having the plurality of first gate drivers and the plurality of data drivers alternately arranged thereon, a second side having the second gate driver disposed thereon, a third side without drivers disposed thereon, and a fourth side without drivers disposed thereon; and
a flexible printed circuit board connected to the plurality of first gate drivers and the plurality of data drivers,
wherein the first side of the flexible substrate is folded at a first side of the display panel such that the plurality of first gate drivers, the plurality of data drivers and the flexible printed circuit board overlap the active region, and
wherein the second side of the flexible substrate is folded at a second side of the display panel such that the second gate driver overlaps the active region.

13. The display apparatus of claim 12, wherein a first gate line of the plurality of first gate lines extends from the first side of the display panel into the active region at a direction that is inclined with respect to the first side of the display panel, and
wherein a first gate line of the plurality of second gate lines extends from the second side of the display panel into the active region at a direction that is inclined with respect to the second side of the display panel.

14. The display apparatus of claim 13, wherein the first gate line of the plurality of first gate lines and the first gate line of the plurality of second gate lines extend in a same direction.

15. The display apparatus of claim 13, wherein the first gate line of the plurality of first gate lines has a zigzag shape and the first gate line of the plurality of second gate lines has a zigzag shape.

16. The display apparatus of claim 13, wherein, when individual pixels of the plurality of pixels are arranged in a plurality of rows and a plurality of columns, the first gate line of the plurality of first gate lines is connected to a first pixel and to a second pixel of the plurality of pixels, the first and second pixels being disposed in a pair of adjacent columns and in different rows, and
a first data line of the plurality of data line is connected to a third pixel and to a fourth pixel of the plurality of pixels, the third and fourth pixels being disposed in a same column.

17. The display apparatus of claim 12, wherein the first and second sides of the display panel are adjacent to each other.

18. The display apparatus of claim 17, wherein the first and second sides of the display panel form a right angle.

* * * * *